United States Patent
Carstensen

[11] Patent Number: 5,237,914
[45] Date of Patent: Aug. 24, 1993

[54] COOKING GRILL ASSEMBLY

[76] Inventor: Morris A. Carstensen, 75883 Price Rd., Space #2 P.O. Box 363, Rainier, Oreg. 97048

[21] Appl. No.: 982,903

[22] Filed: Nov. 30, 1992

[51] Int. Cl.$^5$ .................. A47J 37/06; A47J 37/07
[52] U.S. Cl. ........................ 99/445; 99/400; 99/444; 99/446; 99/450
[58] Field of Search .............. 99/375, 400, 408, 425, 99/444, 445, 446, 450; 126/51, 383

[56] References Cited

U.S. PATENT DOCUMENTS

| | | | |
|---|---|---|---|
| 1,007,323 | 10/1911 | Betts | 99/446 |
| 1,504,102 | 8/1924 | Davis | 99/445 |
| 1,591,291 | 7/1926 | Detwiler | 99/446 |
| 1,956,387 | 4/1934 | Hartman | 99/446 |
| 2,253,834 | 8/1941 | Volks | 99/446 |
| 2,940,381 | 6/1960 | Cottongim et al. | 99/445 |
| 3,092,015 | 6/1963 | Tucker et al. | 99/446 |
| 3,308,747 | 3/1967 | Spagnolo | 99/400 |
| 3,422,746 | 1/1969 | Sheinker | 99/445 |
| 3,443,510 | 5/1969 | Norton | 99/445 |
| 4,598,634 | 7/1986 | Van Horn, II | 99/425 |
| 4,608,917 | 9/1986 | Faaborg | 99/450 |
| 4,909,137 | 3/1990 | Brugnoli | 99/444 |
| 4,936,202 | 6/1990 | Lin | 99/446 |
| 5,044,266 | 9/1991 | Geogaris | 99/446 |

FOREIGN PATENT DOCUMENTS

| | | | |
|---|---|---|---|
| 0099551 | 2/1984 | European Pat. Off. | 99/444 |
| 672387 | 2/1939 | Fed. Rep. of Germany | 99/445 |
| 859708 | 12/1940 | France | 99/400 |

Primary Examiner—Timothy F. Simone
Attorney, Agent, or Firm—Eugene D. Farley

[57] ABSTRACT

A cooking grill assembly adapted to be placed on the upper work surface of a barbecue heating unit. The grill assembly consists of two overlapping slotted plates, a grill component and an underlying drip pan component, releasably hinged together along one margin. The slots are offset from each other in such a manner that the molten fat dripping downwardly through the slots of the upper grill plate will be intercepted by the underlying drip pan plate and conveyed to a fat accumulation trough on the latter. The arrangement is such that the smoke and other combustion vapors can rise upwardly through the slots of both grill components and flavor the meat in the usual manner, without danger of igniting the molten grease resulting from the cooking operation.

6 Claims, 3 Drawing Sheets

COOKING GRILL ASSEMBLY

BACKGROUND OF THE INVENTION

1. Field of the Invention

This invention relates to cooking grill assemblies of the class employed in barbecuing meats, fish, fowl and other foods.

2. Description of the Related Art

As is well known, the operator of the popular barbecue-type cooking grill is faced with a dilemma. On the one hand, it is desirable to permit the smoke and vapors emanating from the fuel employed to circulate around the food being cooked in order to impart to it the much-sought after barbecued flavor. On the other hand, in order to achieve this result it is necessary to provide openings through the food-supporting members of the grill in order to transmit the smoke and other combustion products into contact with the food being grilled.

These openings obviously provide channels through which the melted grease, fats, and other cooking liquids are transmitted to the fire below. The resulting flare-ups cause scorching of the meat. This result in turn imparts an undesired scorched flavor to the finished cooked product. It also produces undesirable meat combustion products which further affect adversely the flavor and quality of the cooked food.

It is the general purpose of the present invention to provide a cooking grill assembly which overcomes the foregoing problem and which, in addition, collects the molten grease and cooking liquors for further application or disposal; which is readily separable into two major components for cleaning and dishwasher washing; which may be used as ancillary appliance with a wide variety of grill cooking unit types, for example charcoal fired, gas fired, or electrically heated; which may be used to cook the wide variety of food categories conventionally subject to barbecuing in cooking grill assemblies; and which may be manufactured from sheet metal easily and inexpensively by a simple stamping operation.

SUMMARY OF THE INVENTION

Broadly considered, the cooking grill assembly accomplishing the foregoing and other objects of the invention comprises in combination with a heating unit a pair of overlapping slotted plates, namely a grill component and a drip pan component. The two components are releasably hinged together along one margin.

The components are perforated with the perforations being laterally offset from each other in such a manner that the molten fat and grease resulting from the barbecuing operation and dripping downwardly through the perforations of the upper or grill component are intercepted by the underlying or drip pan component and conveyed to a fat accumulation receptacle on the latter.

The arrangement is such that the smoke and combustion vapors rise upwardly through the perforations and flavor the meat in the desired manner, but without danger of the molten fat dropping on the burning fuel and being ignited thereby.

DESCRIPTION OF PREFERRED EMBODIMENTS OF THE INVENTION

Figure 1:
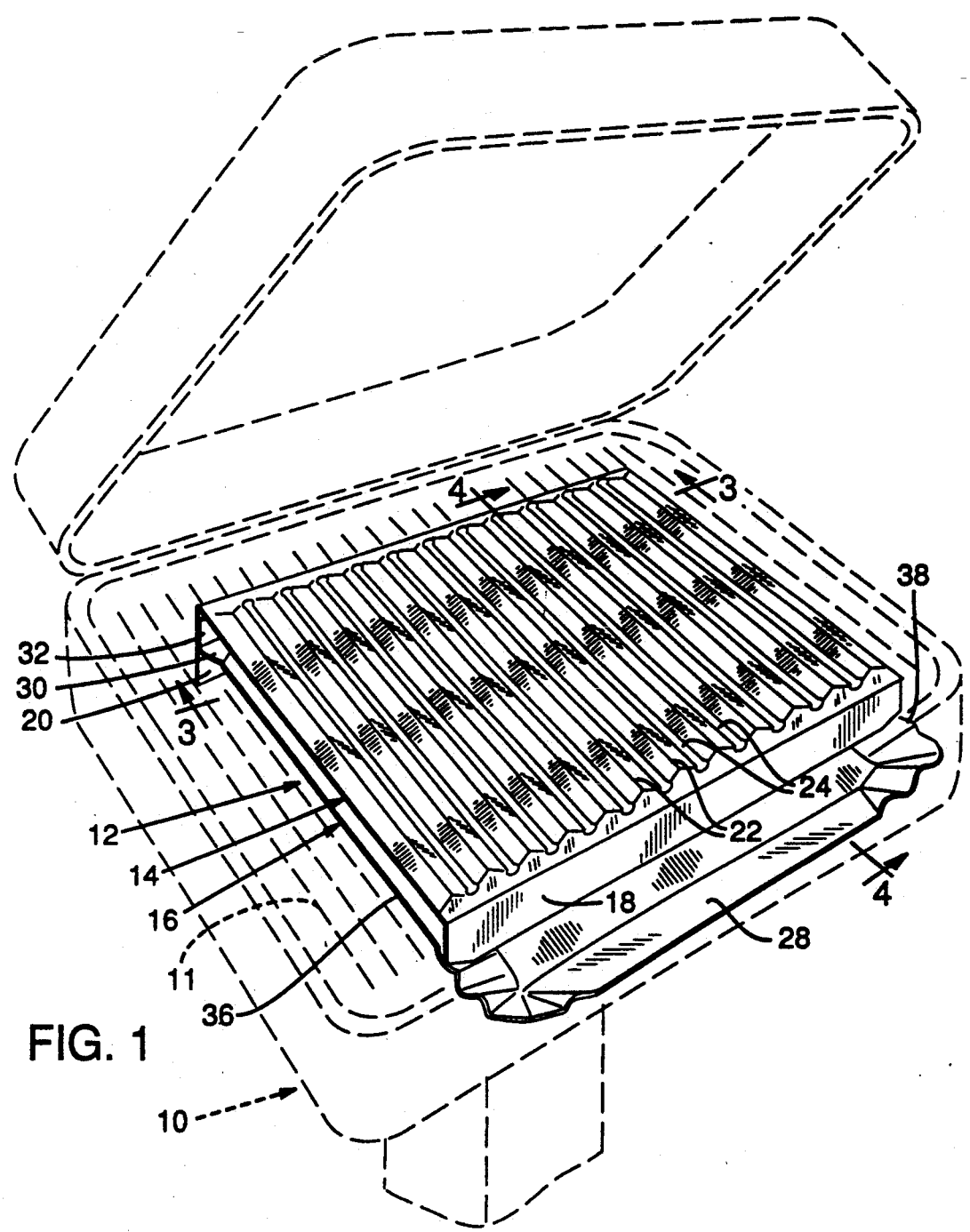
FIG. 1 is a top perspective view of the cooking grill assembly of my invention, shown in its combination with a conventional heating unit.

As is illustrated in the drawings, the cooking grill assembly of my invention is designed for use in combination with a conventional heating unit 10. The heating unit may be of various designs and types, either charcoal fired, gas fired, or electrically heated. Whatever its type, it is provided with a working surface 11 which is designed to support the herein described grill assembly.

The grill assembly, indicated generally at 12, comprises an upper grill component 14 and a lower drip pan component 16 detachably connected to each other along one margin.

Each of these components may be stamped integrally out of a single sheet of sheet metal and thereafter porcelainized, if desired.

Figure 2:
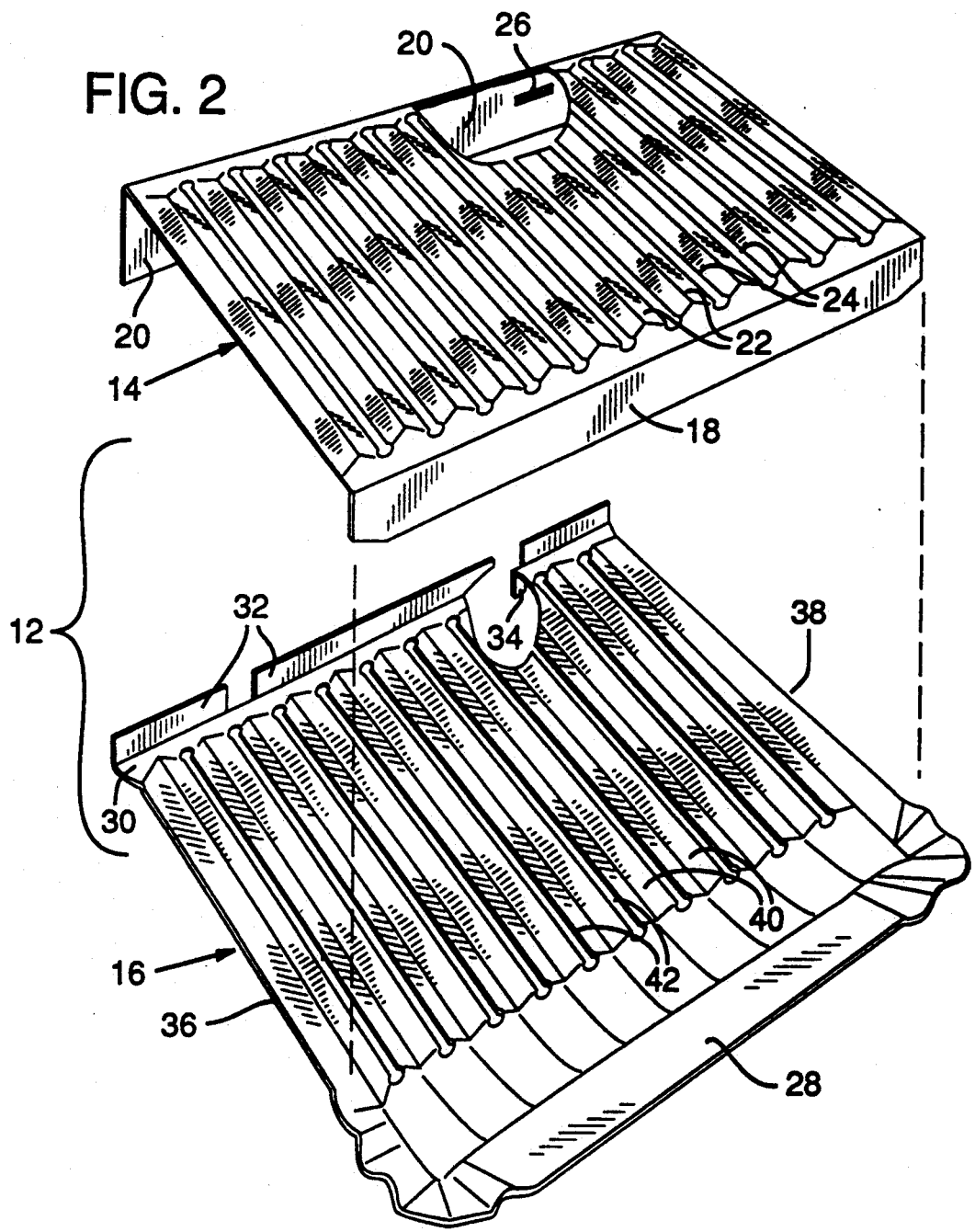
FIG. 2 is an exploded top perspective view of the cooking grill assembly.
Figure 3:
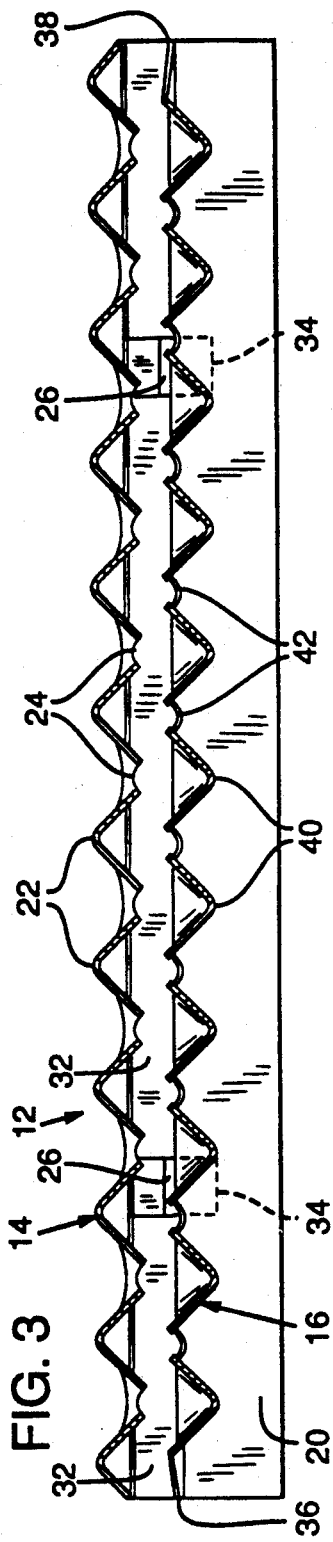
FIG. 3 is a transverse sectional view taken along line 3—3 of FIG. 1.
Figure 4:
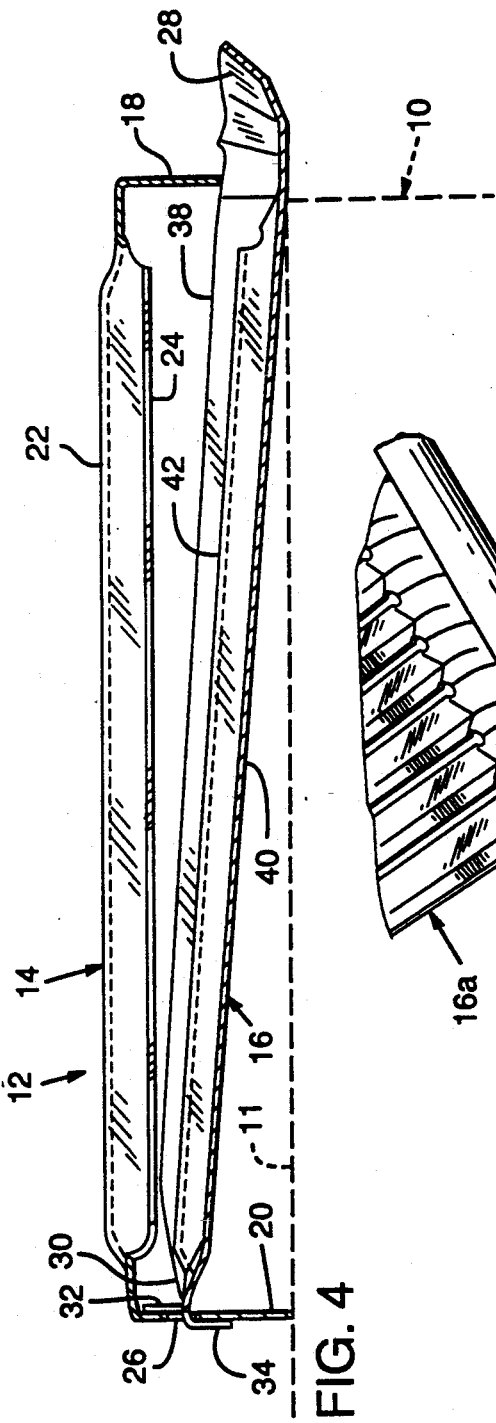
FIG. 4 is a longitudinal sectional view taken along line 4—4 of FIG. 1.

Referring to FIGS. 2, 3 and 4, grill component 14 is provided with a front margin 18 and a parallel rear margin 20, with reference to the position of the operator as he stands in front of the cooking grill assembly.

The forward margin 18 extends downwardly to provide a forward support foot adapted to bear against the upper surface of the underlying drip pan component.

The rearward margin 20 is directed downwardly to provide a rearward support foot adapted to bear against the work surface of the heating unit.

Extending between the grill component margins are a plurality of spaced grill bars 22 alternating with a plurality of spaced, depressed, combination fat drain and gas vent openings 24.

Rearward margin (foot) 20 has a pair of spaced slots 26 the purpose of which will appear hereinafter.

The underlying drip pan component 16 has a forward margin 28 and an opposite, rearward margin 30 substantially underlying the corresponding margins of grill component 14. The undersurface of forward margin 28 is designed to bear directly against work surface 11 of the heating unit, thereby providing support for the forward portion of the grill assembly.

It will be apparent from the drawings that front margin 28 of drip pan component 16 is downwardly dished to provide an integral collection trough for the molten grease and cooking liquids. Also, it extends forwardly out of register with the overlying grill component to afford easy access to the collection trough.

The rear margin 30 of the drip pan component has a vertical back wall 32 which serves as a retaining wall for the molten grease. It also is provided with a plurality of tongues 34, FIG. 4. These are positioned and dimensioned for insertion in slots 26 on the rear margin 20 of grill component 14.

Means thus are provided for supporting the rearward end of drip pan component at a predetermined elevation. The elevation of the support is such as to impart to the drip pan component an inclination downwardly in the forward direction so that molten grease dropping on the drip pan gravitates downwardly into collection trough 28.

Further to promote this result, the entire drip pan component upper surface is dished in the manner evident in FIG. 2. To this end, it is bounded by collection trough 28, back wall 32, and upwardly directed side edges 36, 38.

Extending between the drip pan component front and back margins are a plurality of spaced trough bars 40 alternating with a plurality of spaced, relatively elevated, gas vent slots or openings 42. This construction makes it possible for combustion gases to pass upwardly through the drip pan component while at the same time permitting drainage of the molten fat collected by the trough bars into the collection trough formed integrally with front margin 28.

It will be noted that the troughs of the trough bars are positioned beneath the openings 24 of the grill bars. Accordingly, they intercept the drippings generated by the cooking meat and transmit them to the collection trough.

Figure 5:
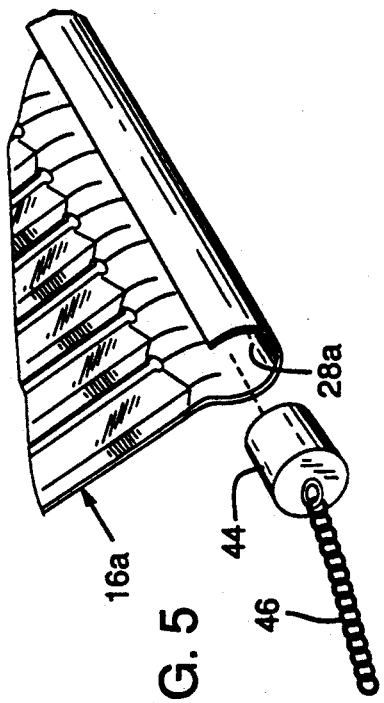
FIG. 5 is a fragmentary top perspective view of an alternate form of the invention.

An alternate form of collection trough is illustrated in FIG. 5. This embodiment has the advantage of providing a collection trough of increased capacity and one having the capability of being emptied periodically during the cooking operation.

To this end, the front margin 28a of drip pan component 16a is shaped in the form of a deeply depressed trough having a substantially circular cross section. The trough preferably is open at both ends and is provided with stoppers 44 and associated pull chains 46. The stoppers may be removed as desired for drainage of the drippings accumulated in the collection trough.

OPERATION

In the operation of the cooking grill assembly of my invention, the grill assembly 12 in its assembled condition is placed on the working surface 11 of the heating unit. This may be a charcoal-fired barbecue 10, as is illustrated in FIG. 1.

The meat or other food to be cooked is placed on the upper surfaces of grill bars 22.

Smoke and combustion gases from the fire in the heating unit pass upwardly through slots 42 and then through laterally offset slots 24. Thereafter they impinge on the food being cooked and impart the desired flavor to it.

Molten fat, grease and cooking liquors produced by the cooking operation pass downwardly through the dual purpose slots 24 in the grill bars. They are collected in the troughs of the underlying trough bars 40 and transmitted to communicating collection trough 28 from which they may be withdrawn at intervals and used for basting, gravy making, or other purposes.

In this manner the drippings not only are preserved; they also are prevented from dropping on the fire contained in the heating unit. They thus are prevented from themselves catching fire and producing combustion products which adversely affect the flavor of the food being cooked.

At the conclusion of the cooking operation, the grill assembly may be cooled, removed from the heating unit and separated into its two component parts. These may be washed quickly, easily and efficiently in a conventional dishwashing apparatus.

Having thus described in detail a preferred embodiment of the invention, it will be apparent to those skilled in the art that various physical changes may be made without altering the inventive concepts and principles embodied. The present embodiments therefore are to be considered as illustrative and not restrictive, the scope of the invention being indicated by the appended claims.

I claim:

1. In combination with a heating unit having a work surface, a cooking grill assembly adapted for placement on the work surface and comprising a grill component and a separable, underlying drip pan component, the grill component having forward, rearward and opposite side margins, the forward margin of the grill component providing a forward support foot to bear against the underlying drip pan component, the rearward margin of the grill component being directed downwardly to provide a rearward support foot to bear against the work surface of the heating unit, and extending between the grill component margins a plurality of spaced grill bars alternating with a plurality of spaced, depressed, combination molten fat drain and gas vent openings, the drip pan component having forward, rearward amd opposite side margins, the forward margin of the drip pan component bearing against the work surface of the heating unit and extending forwardly of the grill component to provide a grease-collection trough, the rearward margin of the drip pan component being positioned contiguous to the rearward support foot of the grill component, releasable interconnecting means on the rearward margin of the drip pan component and on the rearward support foot of the grill component for releasably attaching the rearward margin of the drip pan component to the rearward support foot of the grill component at a predetermined elevation above the bottom end of said rearward support foot to impart a predetermined degree of forward and downward inclination of the drip pan component, and extending between the drip pan component margins a plurality of spaced trough bars alternating with a plurality of spaced, elevated, gas vent openings, the trough bars being positioned beneath the openings of the grill component and communicating with the grease collection trough.

2. The cooking grill assembly of claim 1 wherein the releasable interconnecting comprises tongue and slot attaching means.

3. The cooking grill assembly of claim 2 wherein the tongue is on the drip pan component and the slot is on the rearward support foot of grill component.

4. The cooking grill assembly of claim 1 wherein the grill and drip pan components comprise integral sheet metal components and the grease-collection trough extends the full width of the drip pan component.

5. The cooking grill assembly of claim 1 wherein the openings in the grill and drip pan components comprise elongated slots.

6. The cooking grill assembly of claim 1 wherein the grease collection trough of the drip pan component is substantially circular in cross section and is open at its ends, and stopper means removably closes said open ends.

* * * * *